(12) United States Patent
Mitevski

(10) Patent No.: US 12,206,739 B2
(45) Date of Patent: *Jan. 21, 2025

(54) SYSTEMS AND METHODS FOR MONITORING CROSS-DOMAIN APPLICATIONS IN WEB ENVIRONMENTS

(71) Applicant: Nasdaq, Inc., New York, NY (US)

(72) Inventor: Vladimir Mitevski, New York, NY (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,480

(22) Filed: Oct. 6, 2023

(65) Prior Publication Data

US 2024/0040003 A1 Feb. 1, 2024

Related U.S. Application Data

(63) Continuation of application No. 17/945,164, filed on Sep. 15, 2022, now Pat. No. 11,785,096, which is a (Continued)

(51) Int. Cl.
| | |
|---|---|
| *H04L 67/146* | (2022.01) |
| *H04L 9/40* | (2022.01) |
| *H04L 67/02* | (2022.01) |
| *H04L 67/141* | (2022.01) |
| *H04L 67/50* | (2022.01) |
| *H04L 67/53* | (2022.01) |

(Continued)

(52) U.S. Cl.
CPC ........ *H04L 67/146* (2013.01); *H04L 63/1441* (2013.01); *H04L 67/02* (2013.01); *H04L 67/141* (2013.01); *H04L 67/53* (2022.05); *H04L 67/535* (2022.05); *H04L 43/10* (2013.01); *H04L 67/01* (2022.05)

(58) Field of Classification Search
None
See application file for complete search history.

(56) References Cited

U.S. PATENT DOCUMENTS

| 8,255,523 B1 | 8/2012 | Nikolic |
| 8,898,309 B2 | 11/2014 | Goldspink |

(Continued)

OTHER PUBLICATIONS

International Search Report in corresponding PCT Application No. PCT/US2017/040890 mailed Sep. 13, 2017.
International Preliminary Report in corresponding PCT Application No. PCT/US2017/040890 mailed Aug. 8, 2018.

*Primary Examiner* — Jeffrey R Swearingen
(74) *Attorney, Agent, or Firm* — Nixon & Vanderhye, PC

(57) ABSTRACT

The described technology provides a capability for web applications from different domains to interact within one application environment. For example, an enterprise web application executing on a client terminal is provided the capability to monitor a second web application from a third party vendor even when the second web application is independently executing within an iframe or the like within the enterprise web applications container or context. In some example embodiments, the communication is enabled by a composite cookie or key that incorporates portions of an enterprise web application cookie or key and also portions of a vendor web application cookie or key.

20 Claims, 9 Drawing Sheets

Related U.S. Application Data continuation of application No. 17/158,707, filed on Jan. 26, 2021, now Pat. No. 11,451,636, which is a continuation of application No. 16/786,254, filed on Feb. 10, 2020, now Pat. No. 10,917,476, which is a continuation of application No. 15/643,066, filed on Jul. 6, 2017, now Pat. No. 10,587,696.

(60) Provisional application No. 62/359,196, filed on Jul. 6, 2016.

(51) Int. Cl.
*H04L 43/10* (2022.01)
*H04L 67/01* (2022.01)

(56) References Cited

U.S. PATENT DOCUMENTS

| | | |
|---|---|---|
| 9,065,859 B1 | 6/2015 | Nikolic |
| 9,798,896 B2 | 10/2017 | Jacobsson |
| 10,091,025 B2 * | 10/2018 | Chaturvedi ......... H04L 65/1053 |
| 10,291,722 B1 * | 5/2019 | Mendez ................. H04L 63/20 |
| 10,762,195 B2 * | 9/2020 | Wang ...................... G06F 21/53 |
| 2009/0024737 A1 | 1/2009 | Goldspink |
| 2009/0024748 A1 | 1/2009 | Goldspink et al. |
| 2009/0327421 A1 | 12/2009 | Fu et al. |
| 2010/0281107 A1 | 11/2010 | Fallows et al. |
| 2013/0111576 A1 | 5/2013 | Devine et al. |
| 2015/0081778 A1 | 3/2015 | Zhang et al. |
| 2015/0124586 A1 | 5/2015 | Pani |
| 2015/0262199 A1 | 9/2015 | Taylor et al. |

\* cited by examiner

SYSTEMS AND METHODS FOR MONITORING CROSS-DOMAIN APPLICATIONS IN WEB ENVIRONMENTS

CROSS REFERENCE TO RELATED APPLICATIONS

This application is a continuation of U.S. patent application Ser. No. 17/945,164, filed Sep. 15, 2022, which is a continuation of U.S. patent application Ser. No. 17/158,707 filed Jan. 26, 2021, now U.S. Pat. No. 11,451,636, issued on Sep. 20, 2022, which is a continuation of U.S. patent application Ser. No. 16/786,254 filed Feb. 10, 2020, now U.S. Pat. No. 10,917,476, issued on Feb. 9, 2021, which is a continuation of U.S. patent application Ser. No. 15/643,066 filed Jul. 6, 2017 now U.S. Pat. No. 10,587,696 issued Mar. 10, 2020, which claims the benefit of priority of U.S. Provisional Application No. 62/359,196 filed Jul. 6, 2016, the entire contents of which are incorporated herein by reference.

TECHNICAL OVERVIEW

The technology described herein relates to aspects of communication between web applications, such as, for example, cross domain web applications.

INTRODUCTION

Enterprise software applications deployed on web servers of an enterprise may often have more than one web application providing data or other information/tools to them. When web applications from different origins interact within the same browser or other application environment, security may become an issue. For example, it may be harmful for a first web application from a first source to have the capability to detect certain information about a second web application from a second source when both the first and second web applications execute within the same application environment. In another example, one would not want a first web application from an enterprise domain to inadvertently execute a malicious script or other malicious program served from some other unsecure domain.

Many browsers attempt to address this potential security vulnerability by disabling what is known as cross-domain scripting. That is, these browsers exercise an access control scheme such that content served by one domain to a web browser cannot be read by another domain from within that web browser.

But such access control schemes may prevent some enterprise web applications from being able to efficiently monitor one or more resources served by third parties that are in domains different from the enterprise. For example, although each such third party application may store one or more cookies or other data in the browser memory during execution, the enterprise web application may be prevented by browser access controls from accessing (e.g., reading) any of the cookies or other data written to the browser memory by these third party applications.

Therefore, as more enterprise software applications are deployed as web applications, technology is needed for improving communication and coordination between such applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to communication between web applications. The described technology provides a capability for web applications from different domains to interact within one application environment. For example, an enterprise web application executing on a client terminal is provided the capability to monitor a second web application from a third party vendor even when the second web application is independently executing within an iframe or the like within the enterprise web applications container or context. In some example embodiments, the communication is enabled by generating a composite cookie or key that incorporates portions of an enterprise web application cookie or key and also portions of a vendor web application cookie or key.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

DETAILED DESCRIPTION

Figure 1:
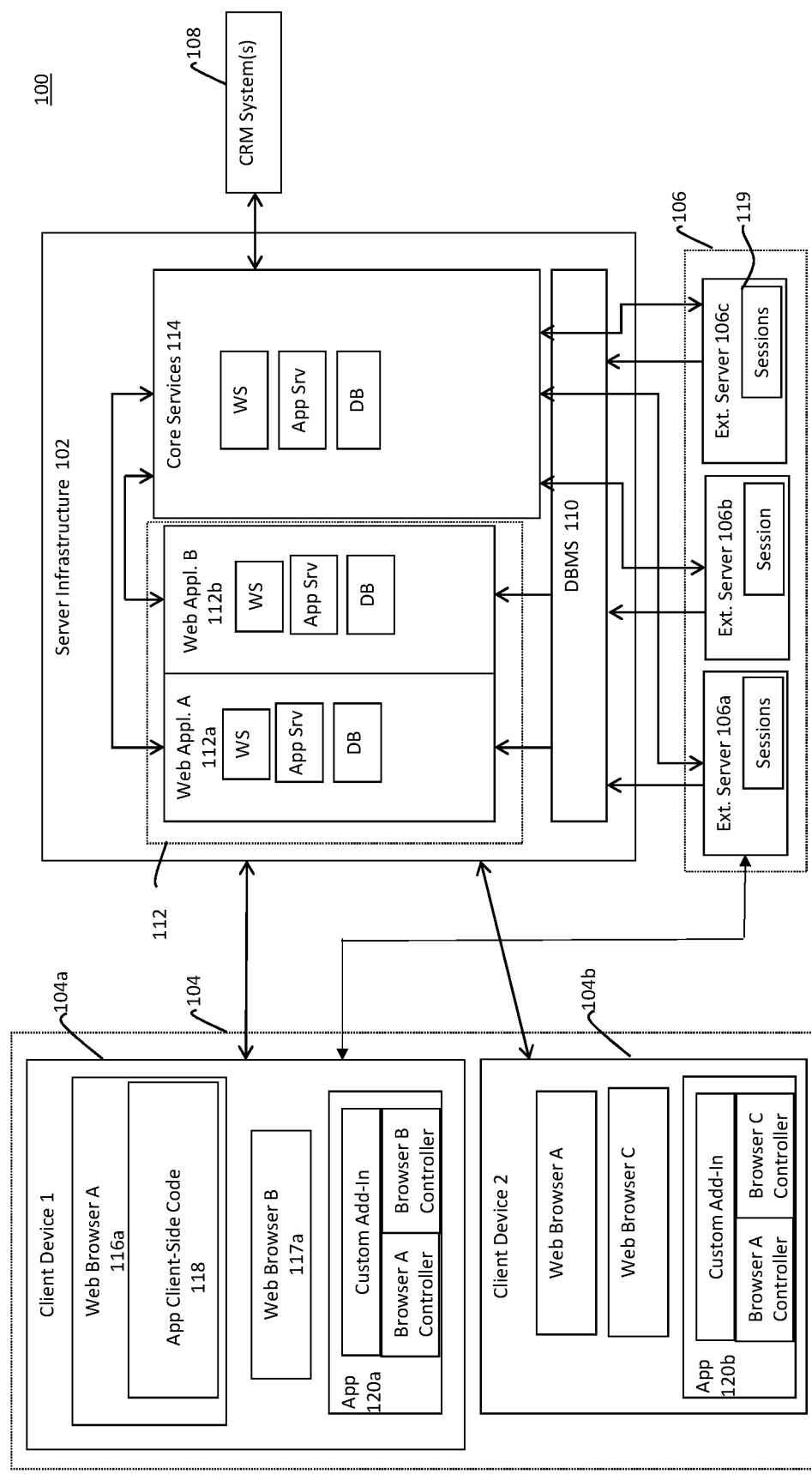
FIG. 1 illustrates a computing environment having one or more client terminals, and one or more server devices executing web applications, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, enabling communication between web applications within an application environment. As noted above, browser restrictions on cross domain scripting may prevent one web application from accessing content including cookies served by another domain. Thus, a conventional enterprise web application in the enterprise domain may not be able to determine certain events pertaining to a vendor application that is executing within the browser context of the enterprise web application. Some example embodiments provide a capability for an enterprise web application, within whose browser context a vendor application runs, to detect certain behaviors of the vendor application.

One solution by which the enterprise web application can access the vendor application is to configure the vendor application to, instead of originating in a different domain than the enterprise web application, to introduce a Domain Name System (DNS) CNAME record that associates the vendor's domain to the same domain as (or a child domain of) the enterprise web application. However, this may not be desirable to many vendors. The embodiments disclosed herein provide another technique by which the enterprise web application can access information regarding the vendor application.

The detection of the status of the vendor application executing within its browser context may be important for several reasons. For example, the enterprise web application should be able to detect any failures (e.g., disconnections, tear downs) of the vendor application connections, so that it can efficiently initiate restoration of those connections. In other circumstances, if the vendor application disconnected any of its sessions due to multiple login prevention (MLP) or the like, then the enterprise web application should be notified of such teardown by the vendor in order to correspondingly enforce such restrictions at the enterprise web application. The MLP capability may be used, for example, to detect when the same identifier/credential (e.g., a user ID or credential of a particular user) is used to access a web application from multiple endpoints at the same time, and may act to cancel one or more sessions in order to reduce misuse of access capabilities to the web application. Other examples exist.

Figure 2:
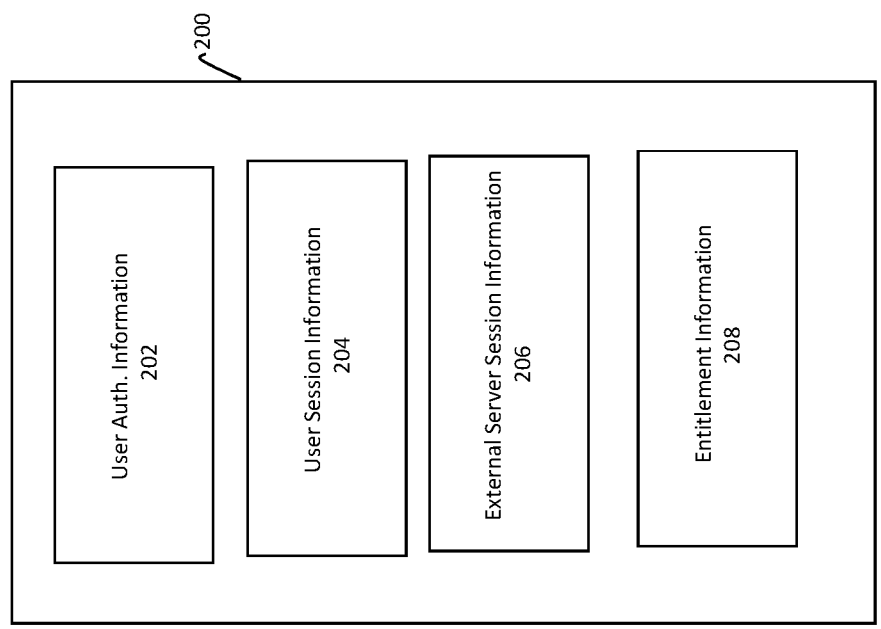
FIG. 2 illustrates some of the data tables that may be maintained by the one or more servers of FIG. 1, according to some example embodiments.
Figure 3:
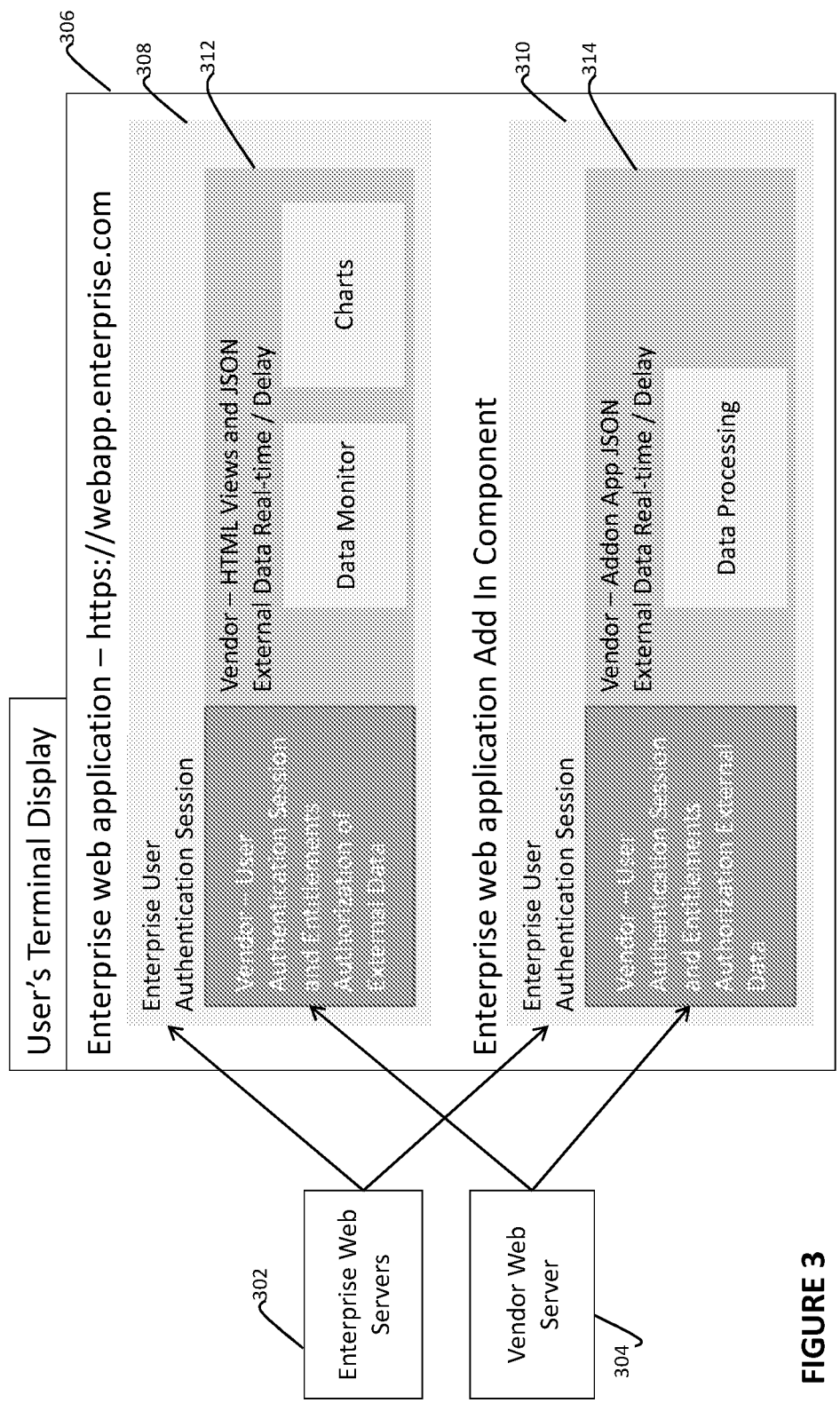
FIG. 3 is a schematic illustration of a user terminal when a web application and an addon application are both active, according to some example embodiments.
Figure 4:
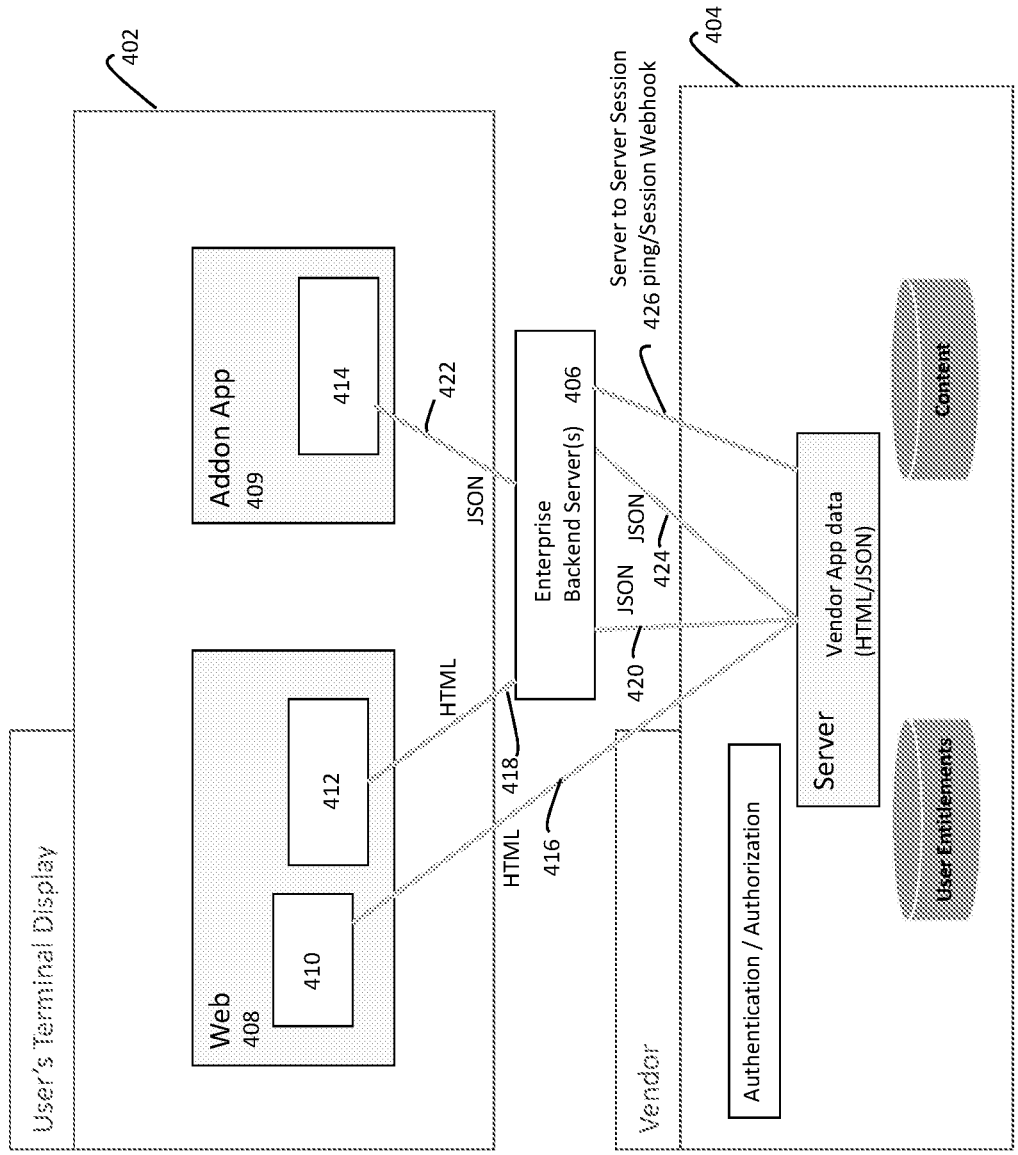
FIG. 4 is a schematic illustration of components from the user terminal, the enterprise servers, and vendor servers, and some of the data flows between them, according to some example embodiments.
Figure 5:
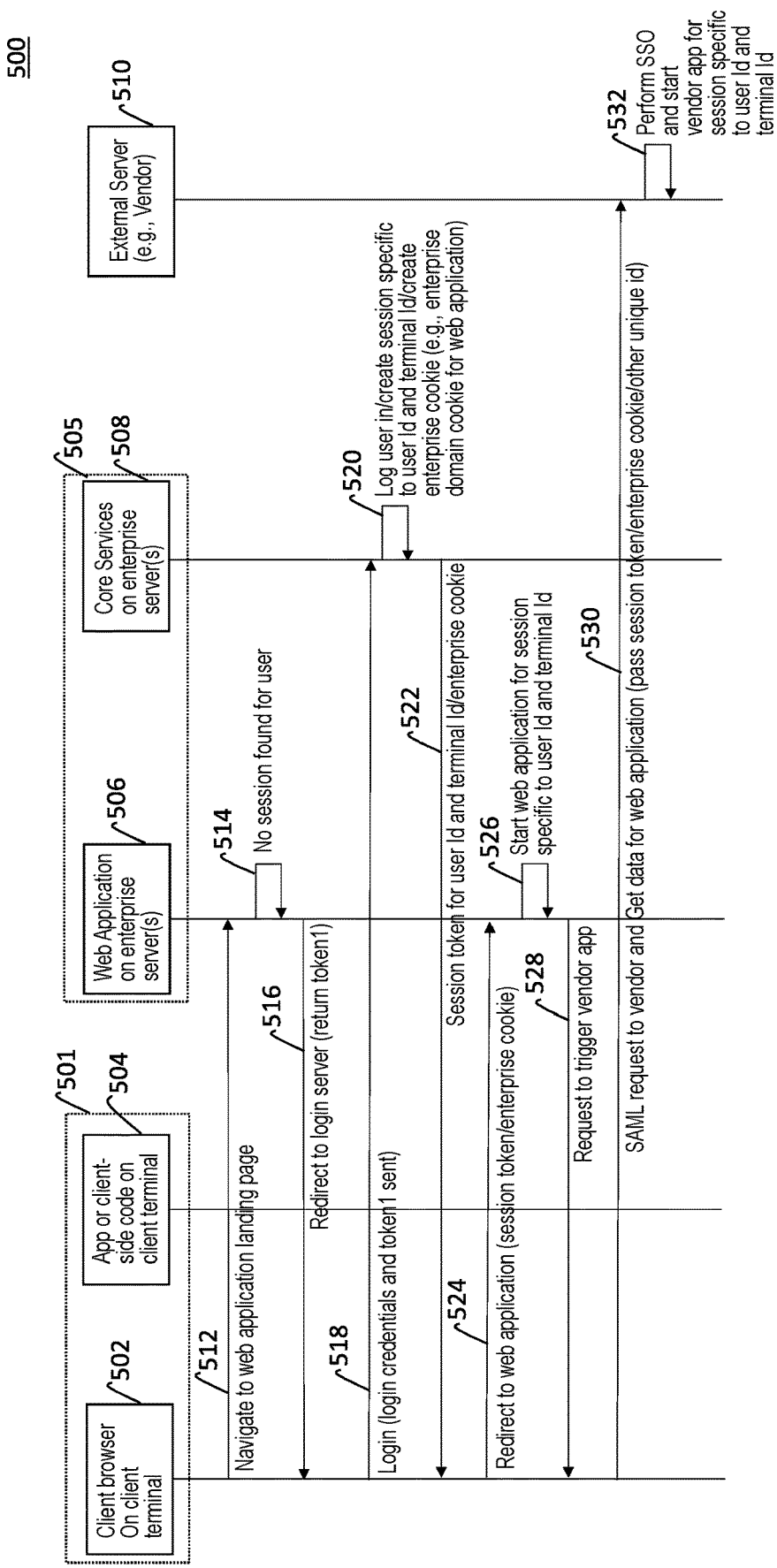
FIGS. 5, 6 and 7 illustrates a flow diagram showing interactions between a client terminal, enterprise servers and an external vendor's server, according to some example embodiments.
Figure 6:
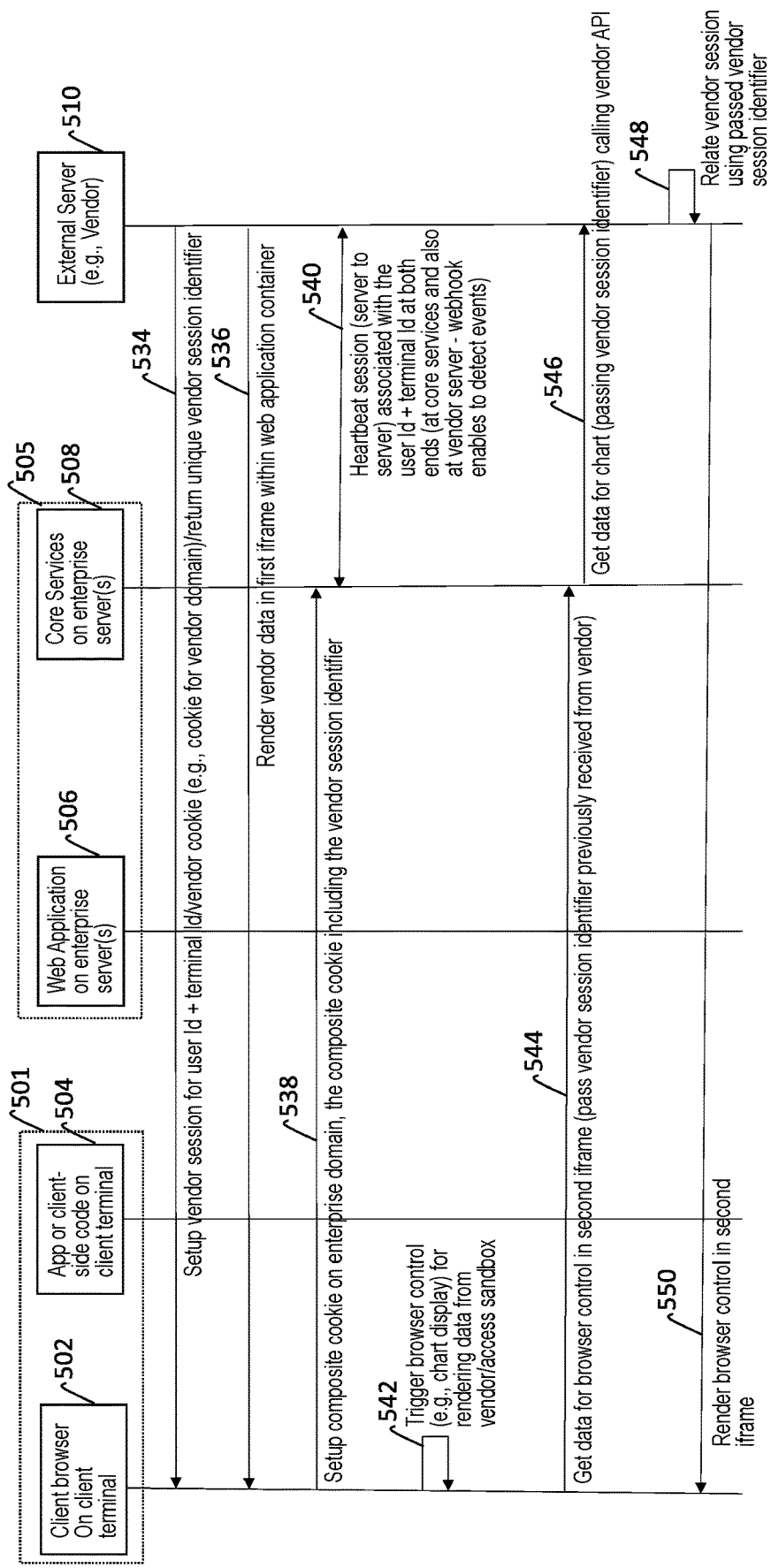
Figure 7:
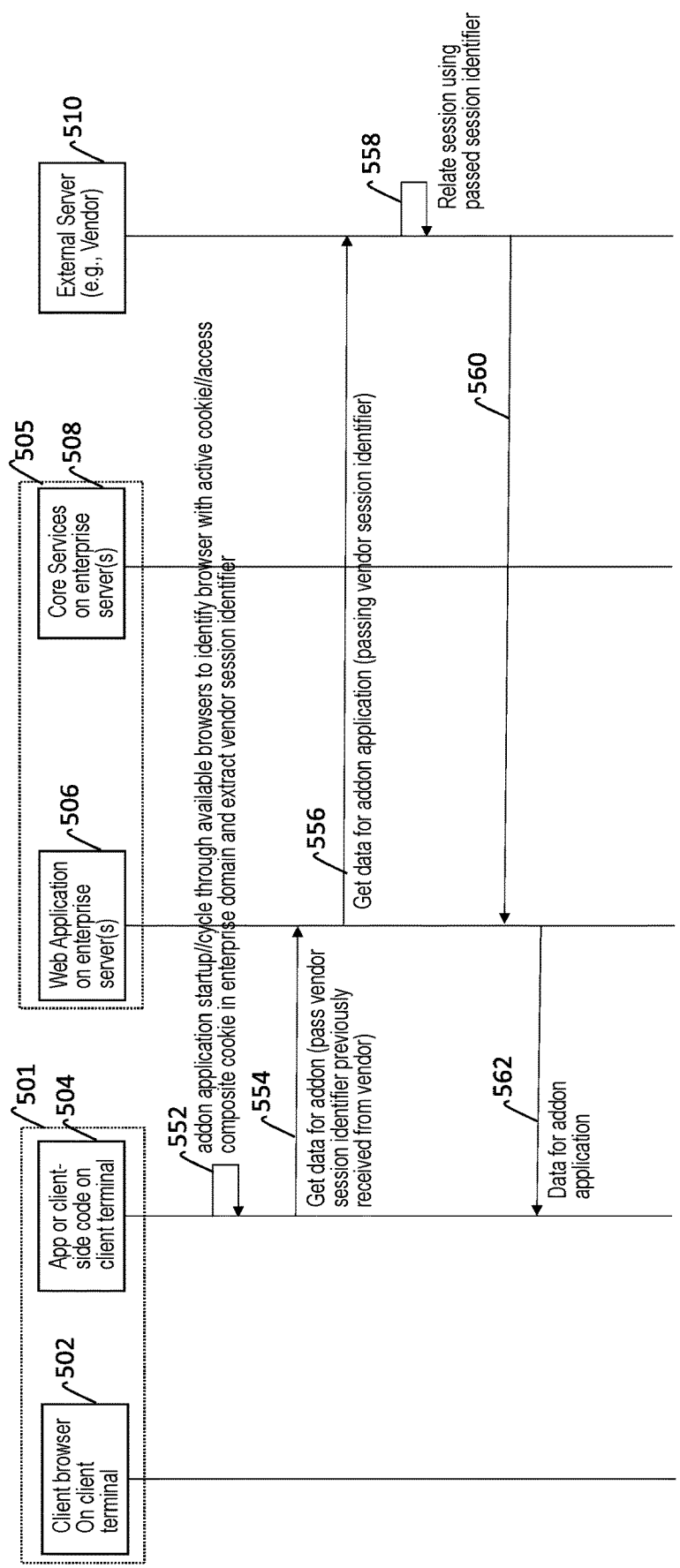
Figure 8:
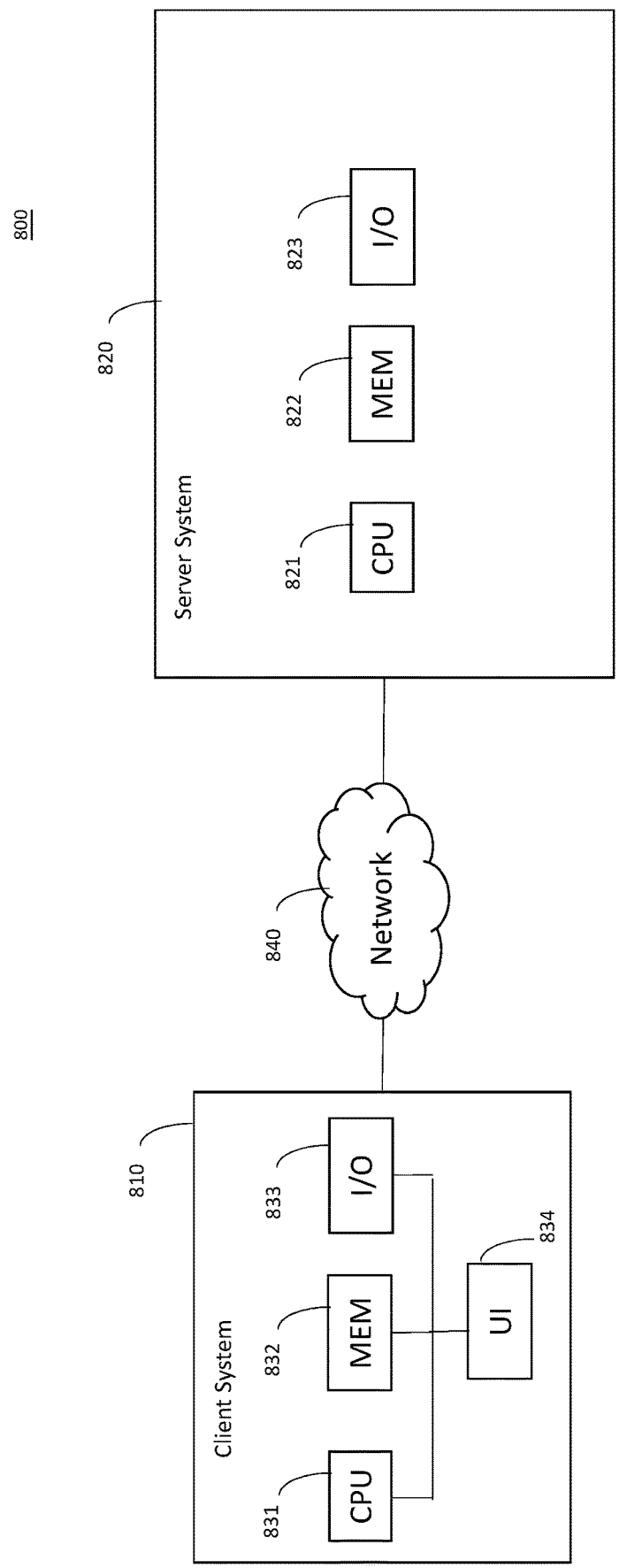
FIG. 8 schematically illustrates a computing environment in which the client terminals and/or servers can be implemented, in accordance with some example embodiments.
Figure 9:
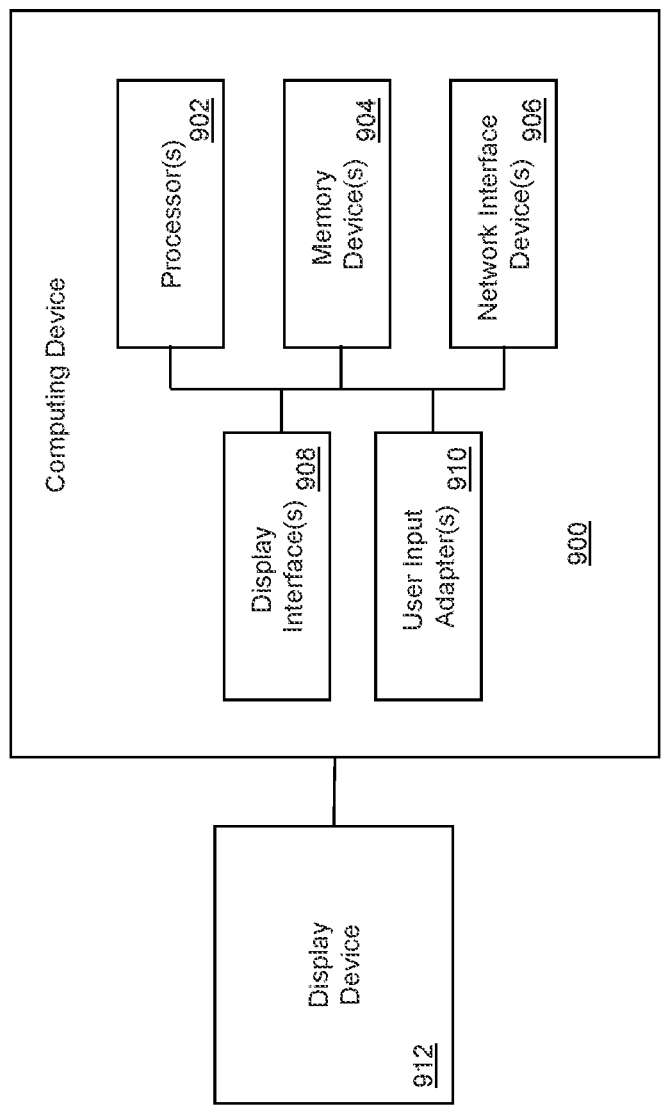
FIG. 9 shows an example computing device that may be used in some embodiments to implement features described herein.

FIGS. 1-9 illustrate aspects of some example embodiments. FIG. 1 illustrates a non-limiting computing environment which includes one or more enterprise servers running one or more web applications and one or more client terminals accessing the web applications, according to some embodiments. FIG. 1 also illustrates one or more external servers which may provide data services to the one or more web applications. A client terminal may run a client-side portion of a web application which includes, running within its browser context, an external server provided application that serve content from a domain different from that of the domain in which the web application operates. FIG. 2 illustrates an example collection of data tables that may be maintained by and/or is accessible to a core services application in the enterprise servers. FIG. 3 is a schematic illustration of a display on an example client terminal during the execution of a client-side portion of the web application interacting with the enterprise servers. FIG. 4 illustrates some example data flows between a client terminal, enterprise servers, and an external server shown in FIG. 1. FIGS. 5, 6 and 7 illustrate further details of example interactions between the client terminal, the enterprise server and the external server shown in FIG. 1. FIG. 8 shows a non-limiting example block diagram of a hardware architecture for the system shown in FIG. 1. FIG. 9 shows an example hardware implementation of a client or a server in FIG. 1.

Description of FIG. 1

FIG. 1 illustrates a non-limiting computing environment 100 including one or more servers 102 (also referred to herein as "server infrastructure") and one or more clients 104, according to some embodiments. The one or more servers 102 communicate with clients 104 and one or more external servers, so that users on clients 104 can access web applications 112 executed on the one or more servers 102. Servers 102 may also communicate with a document management system 108. The communication between the servers 102, clients 104, external servers 106, and document management system 108 may be over the internet or any other communication network.

Servers 102 may be implemented on one or more physical server computers that are communicatively connected to each other over a network. The one or more physical server computers may be geographically co-located or distributed. Servers 102 may include a database management system 110 and one or more server-side web applications 112 (e.g., 112a and 112b) and a core services application 114.

Each web application 112 may be designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of each web application 112 provides the processing logic for the application, and the database of each web application 112 provides for storing and reading data.

Web applications 112 may interact with the core services application 114 for managing user authentication, with clients 104 (e.g., 104a and 104b) for receiving input from and for transmitting out to, and the database management system 110 and/or external servers 106 for obtaining information to be provided to the requesting client applications running on clients 104. In some embodiments, some or all of the information provided to requesting clients may be generated by the web application itself and/or other web application executing locally on the same one or more servers 102.

Core services application 114, which may also be designed and operated according to the three-tier model described above, may provide one or more services that are commonly used by the web applications 112. Example services that may be provided by core services application 114 include authentication of users, management of sessions, etc.

In some embodiments, core services application 114 can also provide session management to the external servers 106. For example, in a use case where two or more web applications 112 obtain data from a particular external server 106, core services application 114 may provide the capability to manage sessions between servers 102 and the external servers 106 in accordance with corresponding other sessions between clients 104 and servers 102. Each external server may store a copy 119 of a part of a session table maintained at the server 102.

Web applications 112 operate to receive requests (e.g., HTTP requests) from clients 104, perform processing and/or obtain information from the database 110 and/or external servers 106, and respond to clients 104 with a result from the processing and/or obtained data. Web applications 112 may utilize core services 114 for administering users and user sessions.

A web application may comprise one or more client-side components and one or more server-side components. Client-side components of a web application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client terminal requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 110 (sometimes also referred to herein simply as the database), may be a commercially available DBMS, or other data record management system. Although shown as a single DBMS, DMBS 110 may include one or more separate databases. Embodiments are not limited to any type of database management system.

Clients 104a and 104b can be configured to execute the same or different client applications. In the illustrated example embodiment in FIG. 1, first clients 104a includes a web browser A 116 and a web browser B 117. Client 104a may also have stored on it a client-side app 120a which is a native app. When browser A 116 is used to access a web application 112, client-side code 118 for a web application 112 executed within browser A 116. In the same example embodiment, the second client 104b is configured to execute an app 120b which may be a native app. Client 104b may have browsers (e.g., as shown browser A and browser C) in addition to the native app 120b. The client-side code 118 and app 120 may perform client-side processing for a corresponding web application on server 102.

As illustrated in FIG. 1, when a client application (e.g., 116/118 or 120a/120b) communicates with a web application 112, the web application 112 may obtain any information requested by the client from one or more external servers 106 and provide to the client application. In some embodiments, some or all of the information provided to the requesting clients 104 may be generated locally by servers 102. After initial authentication and/or session creation through the server infrastructure 102, the client application may alternatively or additionally interact with one or more external servers 106 without sending/receiving messages through the server infrastructure.

Clients 104 may include personal computers, mobile computers, tablets, smartphones, and other electronic devices. In some example embodiments, any electronic computing device including at least a display, an input device for user input, and a communication interface for communicating with the server device may operate as a client terminal.

The external servers 106 (e.g., 106a, 106b, 106c) may include one or more servers controlled by an entity (e.g., administrative entity) different from the entity controlling the one or more servers 102. For example, one or more of the external servers 106 may be managed by a service provider or vendor that, under a predetermined (e.g., previously agreed upon by an enterprise and a vendor) service specification, provides users on client terminals 104 access to various application data and/or analysis. The service specification may be based upon one or more of a number of users, type and amount of information, duration of use, frequency of use etc., of the access to the external servers.

It should be understood that the software modules shown in FIG. 1 are stored in and executed by hardware components (such as processors and memories); and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 8, as well as in other places in this document.

In an example implementation, the computing environment 100 may be associated with an enterprise, such as, for example, Nasdaq, Inc. Example web applications 112 may include real-time market analysis application and a client account status application. Users of the web applications 112 may include financial analysts or other employees of the enterprise. The core services application 114 may provide common services such as administration (e.g., creating user accounts, administering entitlements, etc.) authentication (e.g., create/manage sessions for users to access certain services, etc.) and authorization (e.g., check whether user is entitled to access certain services or features, etc.) for users. The servers 102 may represent one or more servers and the associated infrastructure used by the enterprise for running the web applications 112, core services application 114 and associated software. The document management system 108 may include a customer relationship management application that communicates with the web applications and/or core services application for delivering services to the corporation's users.

In this example implementation, the external servers 106 each may be operated by a respective vendor of application data. Each vendor may provide application data such as real-time financial market related information to entities such as Nasdaq, Inc. under some sort of service specification (e.g., an agreed price based upon type of data, amount of use, number of users, etc.).

When an analyst using client 104a accesses the real-time market analysis application on servers 102, an SPA may be displayed on the client terminal, and various real-time or value-added information from the vendors (e.g., such as those operating external servers 106) and/or the corporation's internal analysts etc., can be displayed in the one or more portions of the displayed SPA.

The external servers 106 (e.g., vendors), although providing the information requested and capable of identifying the users accessing its services, may rely upon the enterprise (as the "vendor of record") to ensure its user's compliance with the terms of use specified, for example, in a service specification agreed between the enterprise and the vendor. For example, based upon the agreement with a particular vendor, the core services application may be used to assign entitlements (a specification of type/amount of data accessible and other restrictions, if any) to the users and/or web applications to access/obtain data from that particular vendor. Core services 114 may establish sessions with the vendor for respective users who have a valid entitlement to that vendor's data. Core services 114 may cause, or may maintain, a session table (e.g., 116) at each vendor. When a user of a client terminal 114 requests (e.g., by an HTTP request) data from the vendor, for example, through one of the web applications on server 102, the vendor may, in some embodiments, check its copy of the session table and request core services 114 for verification that the requesting user's entitlement is valid, and would provide the requested data if the entitlement is valid.

In the example above, the enterprise web application 112 may operate in a first domain, such as, for example, an enterprise domain, whereas at least some of the external servers 106 may operate in one or more second domains (e.g., a vendor domain) that are distinct from the first domain. For example, web applications 112 and core services 114 running on server infrastructure 102 may operate in the domain "nasdaq.com" and external servers 106a, 106b and 106c may operate in the separate domains "vendor106a.com", vendor106b.com" and "vendor106c.com", respectively. As the term "domain" is used herein, where a first group of computers and networks use a first domain name, and a second group of computers and networks use a second domain name, the first group of computers belong to a different domain than the second group of computers. In some examples, the second domain name may be defined as a sub domain (e.g., a child domain) of the first domain name. In some other examples, the first and second domains (corresponding respectively to the first domain name and the second domain name) may represent groups of computers and/or networks that are administered by different entities (e.g., different enterprises/corporations). In some embodiments, domains are defined in accordance with the Domain Name System (DNS) of the Internet. A top-level domain (TLD) is a domain at the highest level in the hierarchical DNS. The top-level domain names are installed in the root zone of the name space, and is managed by the Internet Assigned Numbers Authority (IANA). Domains in the lower levels are assigned by DNS registrars to entities that operate each domain. For example, a DNS registrar may have assigned the domain "nasdaq.com" to Nasdaq, Inc. which operates that domain. The ".com" in "nasdaq.com" refers to the corresponding top level domain. The DNS registrar may assign another domain "examplevendor.com" to a service provider such as a service provider operating external server 106a.

Description of FIG. 2

FIG. 2 illustrates an example collection of data tables 200 that may be maintained by and/or is accessible to core services application 114, according to some example embodiments. Although referred to as "tables", the data discussed in relation to FIG. 2 may be stored in any form or data structure accessible to the core services application 114 and/or other application configured to make use of the data.

User authentication information 202 may include a table of user authentication information, that is accessed by the core services 114 in order to authenticate a user during, for example, sign-on to one or more of the web applications. For each user, identifying information, such as, for example, any of user Id, password, user-specific cookies, and entitlements associated with the user etc. may be maintained in user authentication information 202.

User session information 204 includes a record of the currently active sessions by which users, such as users on client terminals 104, communicate with a web application on server 102. User session information 204 may be in the form of a table with each row representing an active session. In some embodiments, inactive sessions (e.g., recently deactivated/cancelled sessions) too may also be in the table. The user session information table 204 may include, for each session, fields/columns such as user Id, web application for which the session serves, client, authenticated session identifier and/or one or more cookies. The table may also include start and end times for the session, and a current status. The status may, for example, indicate whether the session has been terminated or is currently active, and if terminated, a reason for the termination (e.g., terminated due to MLP).

External server session information 206 stores the user sessions pertaining to the respective external servers 106. In some embodiments, external server session information 206 may be maintained in data structures per external server 106. In some embodiments, each table 206 can be provided to the corresponding external server 106 so that the permissions and/or entitlements associated with a request (e.g., an HTTP request for a connection/session) can be checked locally by the external server when the request is serviced. In some embodiments, sessions between the server device 102 and external servers 106 may be based on user session information 204, and a separate table may not be necessary.

Entitlement information 208 includes information regarding entitlements associated with access to the web applications. Entitlements, as described above, specify the scope of access to one or more external servers (or other resources) for a user or group of users. For example, entitlement information 208 may specify the external servers (vendors) and the types of data to which each user or group of users have access. Entitlements may also specify whether simultaneous access by more than one client application (e.g., simultaneous access via a browser and a native app) by the same user is allowed for a particular web application.

Description of FIG. 3

FIG. 3 is a schematic illustration of a display on a client terminal 306 during the execution of a client component of an example enterprise web application. As shown in FIG. 1, the client terminals are in communication with the server infrastructure 102 of the enterprise, and at least some client terminals may be in communication with one or more external servers (e.g., vendor servers) 106. The example web application shown in FIG. 3 utilizes data from a web server 302 (e.g., a web server from server infrastructure 102) of the enterprise, and also data from a vendor's server 304 (e.g., one or more of the external servers 106) for rendering its display.

The client terminal 306 may simultaneously display a window rendering the output of an addon component to the example web application. Example addon components may include the Excel addon discussed above. The addon component too may simultaneously use data served from the enterprise web server 302 and vendor server 304 for its data processing and/or rendering.

Window 308 may be controlled by (and/or used for serving content generated by) the web application, and may, in some embodiments, be a browser window. Window 308 may display web pages of an SPA or other web application, and may be represented as a container for the web application. Window 308 may have one or more sub-windows 312 within it. The one or more sub-windows may be implemented as iframes, and may each render and/or process data from the vendor server 304. An HTML iframe (or "Inline Frame Element") represents a nested browsing context, effectively embedding another HTML page into the current page.

In some example embodiments, the web application executing within window 308 may trigger the vendor application which controls the display within iframes 312. Alternatively, the display within one or more iframes 312 may be controlled by a backend server controlled by the enterprise, using data received from the vendor application. In an example embodiment, one (e.g., "Data Monitor") of the iframes 312 may render a real-time or delayed data stream from the vendor app (e.g., such as stock prices), and another (e.g., "Charts") iframe 312 may render a chart (e.g., a time series chart etc.) based on cumulative real-time data and/or other data from the vendor application. The iframes 312 may be considered as executing within the browser context of the web application.

In example embodiments, the user may login and be authenticated to the web application within window 308. The user may be logged into the vendor application using single sign on (SSO) or the like. In some embodiments, the user may separately login to the vendor application.

A process similar to what occurs in window 308 may also occur in window 310. The enterprise addon application (e.g., client side application 120*a*) controls the window 310. Data from the vendor application may be utilized in at least a portion 314 of the addon application. The portion 314 may be a sub-window of window 310 or may be data incorporated into a single document 314.

In the above described example embodiments, the windows 308-314 are operate based upon a single authenticated user session. For example, the single authenticated user session may refer to data connections based upon the same user ID and terminal ID combination. Regulatory or other requirements may dictate that access to data, such as that provided by the vendor application, be controlled so that the same user ID can access that data only from a single terminal at a time. The terminal ID may refer to one or more displays controlled by one or more computers. For example, in some embodiments a unique terminal ID may be assigned to each monitor of a computer, and in some other embodiments, two or more computers (with their associated monitors) may be identified by a single terminal ID.

An issue associated with the environment shown in FIG. 3, is that the enterprise web application may not be fully aware of the status of the vendor application executing (e.g. serving content) in the iframes (or sub-windows) within its browser context. This inability to detect the status of the vendor session (e.g., whether the vendor is continuing to serve data in the iframes or sub-windows) may result in situations where the disconnections of user sessions by the vendor go undetected by the enterprise web application for extended time periods. Example embodiments provide techniques for the enterprise application to be efficiently notified of the status of the vendor application.

Description of FIG. 4

FIG. 4 illustrates some of the data flows between the user terminal 402, enterprise servers 406, and the vendor servers 404, according to some example embodiments. Further details of these data flows are described in FIGS. 5-7.

User terminal 402 includes a window 408 executing a web application and a window 409 executing an addon application (e.g., client side application 120*a*), which may have been triggered by the web application. The window may have within it iframes 410 and 412 which operate for displaying the data from vendor server 404. In some example embodiments, the vendor server 404 may render vendor data in iframe 410, while, in iframe 412, vendor data is rendered by the enterprise server 406 based upon input received from the vendor servers 404. The window 410 may be rendered by directly accessing the vendor server 404, without going through the enterprise servers. The data flow 416 may be HTML. The data for window 412, may first be received by the enterprise server 406 in the form of JSON from vendor server 404, and then transmitted as HTML from the enterprise server 406 to the window 412.

Addon application window 409 may include a portion 414 in which vendor data is displayed and/or processed for display. The vendor data for portion 414 may be first received by enterprise server 406, where it may be subjected to optional processing, before being sent to addon application 409 on the user terminal 402. The data for portion 414, may first be received by the enterprise server 406 in the form of JSON from vendor server 404, and then transmitted as JSON from the enterprise server 406 to the addon application 409, where it can be displayed and/or processed.

In addition to the data flows 416-424 for receiving data from the vendor, a connection 426 is established for monitoring the health of the data flows 416-424. Connection 426 may be referred to as a "heartbeat connection" and is associated with the user session identifier for the user session used in data flows 416-424.

Some application environments require (e.g., for regulatory or commercial reasons) that the vendor relates each of the connections (e.g. data channels) 416, 420 and 424, to the same user ID and terminal ID combination or user session.

Since, as evident in the description of process 500 below, each of these connections are instantiated at different times by, in some cases, different components of the enterprise web application, addon component, or enterprise server, the vendor server must be provided with sufficient information at the time each connection is requested so that the vendor can recognize that they should all be associated with the same user session.

In example embodiments, upon creating connection 416, the vendor also informs the enterprise web application of a unique vendor session identifier that it has associated with connection 416. Then, the client terminal or correspondingly the enterprise server, upon each subsequent request to the vendor (e.g., HTTP requests to establish connections 420, 424 and 426) transmits this unique vendor session identifier to the vendor with the request. The vendor can thereby associate each subsequent connection 420, 424 and 426, with connection 416.

In order to enable the different components to access the unique vendor session identifier, the web application creates a composite cookie that includes both the enterprise domain cookie information and the unique vendor id and stores it in the enterprise domain. In this manner, although the enterprise application components cannot access the cookies served to the browser by the vendor, the enterprise application components can still access the unique vendor session identifier by accessing the composite cookie stored in the enterprise domain (e.g., in the browser context and/or at the enterprise server) and extracting the vendor session identifier from the composite cookie.

The heartbeat connection 426, being associated with the same user session as the connections 416, 420 and 424, enables the enterprise server to be notified by (e.g., using any type of messaging and/or a Webhook solution which provides for a HTTP callback) if a fault (e.g., teardown due to MLP, or disconnect due to other fault) has occurred to any connection associated with the user session.

Description of FIG. 5

FIGS. 5, 6 and 7 illustrate interactions between a client terminal 501 (e.g., similar to client terminals 104*a*, 104*b*) and one or more enterprise servers 505 (e.g., server infrastructure 102) and external server 510 (also referred to as "vendor server" 510) that occur while performing a process 500 to run a web application which includes, running within its browser context, vendor provided applications that serve content from a domain different from that of the enterprise domain, according to some example embodiments.

Process 500 may be commenced when the user navigates the browser to a so-called "landing page" for the web application. For example, for a web application named "IR Insight", the landing page may be at an address such as irinsight.nasdaq.com known to the user. The navigation may be performed by entering a URL for the landing page, or by clicking on a corresponding link from another web page. At operation 512, the browser (e.g. client browser 502) on the client terminal navigates to the landing page hosted by the web application 506 running on the enterprise server.

At operation 514, the web application determines if a corresponding currently active session and cookie exists. If an active session (e.g. session table entry or and/or cookie) is not found, then the web application may generate a temporary token and send the token to the client terminal. In some embodiments, the temporary token may be pushed to the client along with the domain cookie for the web application.

At operation 516, the web application redirects the client terminal to a login application. According to an embodiment, the redirection is performed by sending to the client a 302 HTTP redirect message directing the browser on the client terminal to the login application. A known identifier for the web application can be passed with the redirect message, so that the login application can subsequently, after the login process is complete, redirect the client back to the web application. According to an embodiment, a globally unique identifier (GUID) assigned to the web application can be used as the identifier passed with the redirect messages.

At operation 518, the browser, having received the redirect message from the web application, navigates to the login application at the address indicated in the redirect message. The login application may be run as a core service 508 in the enterprise server 505. When accessing the login application, the browser may identify the web application (which redirected the browser) by including the corresponding GUID in the HTTP request. The login application may prompt the user for login credentials. The client may transmit the login credential in response to the prompt, or before being prompted. According to an embodiment, the login credentials include a username and password.

At operation 520, the login application verifies the login credentials. For example, the username and password is verified against stored login and/or authentication information. After the user login is authenticated, one or more currently existing sessions may be cancelled so that the relevant service specifications are not violated. According to an embodiment, existing sessions for the user to access the web application may be cancelled. For example, a first-in-first-out (FIFO) policy may be implemented with respect to cancelling sessions when new sessions are established. Thus, for example, if the service specification limits the number of client applications that can simultaneously access a particular web application to one, then, when the new session is created, the earlier established session is cancelled. In another embodiment, existing sessions of the user for accessing the web application are cancelled if they are in the same "realm" associated with the new sign-on. A "realm" is a construct used to group GUIDs and/or GUID-client combinations. For example, by arranging particular combinations of web application and client types (e.g., desktop computer, smartphone) into different realms, simultaneous sign-on to the same web application by the same user on a desktop computer and a smartphone may be permitted.

The sign-on process for the user, when successful, results in the creation of a session and the generation of a cookie. The creation of a session includes adding an entry to a session table, such as, for example, user session information 204. The cookie may be unique to the created session, and may be a text string generated using conventional techniques. The cookie is returned by server 505 to client 501, and is saved at client 501 for future use. Subsequent requests (e.g., HTTP requests) by the user using client 501 to the web application at server 505 includes the cookie, and server 505 may use the received cookie for keeping track of related requests. At this point the user is properly signed-on to the web application, and a client-side portion of the web application operating in the browser context can exchange messages and/or data with the server-side portion of the web application The user session may be uniquely identified by a user session identifier (also referred to as "session token") based upon a combination of the user ID and the terminal ID. As noted above, a terminal ID may represent one or more display terminals attached to one or more computers.

An enterprise cookie may also be generated at operation 520. The enterprise cookie is intended for passing between the client and server components of the enterprise web application. In some cases, the enterprise cookie can be passed between different web applications of the enterprise. In some embodiments, the enterprise cookie is used as the session token, and in some embodiments, the session token may include at least a portion of the enterprise cookie.

At operation 522, the login application provides the web application executing on the client browser with a session token/enterprise cookie for identifying the session based upon the user ID and terminal ID. This may be performed using HTTP POST message, with the token and/or cookie specified in key/value pair form. In some embodiments, one or more other tokens can be provided along with the session token/enterprise cookie. The client browser stores the enterprise cookie in local storage. In example embodiments, the browser may store the enterprise cookie in predetermined cookie storage location in memory or local hard disk storage to which access is controlled by the browser.

At operation 524, the login application redirects the client to the web application using an HTTP redirect message and the identifier (e.g., GUID) of the web application received earlier. The session token and/or enterprise cookie may be passed with the request to the web application on the enterprise server.

At operation 526, after authenticating the request based upon the session token and/or the enterprise cookie, the web application on the enterprise server begins execution for the user session.

The enterprise server also determines that the user session has been configured to include data from a particular vendor application. This determination may be made based upon predetermined configuration performed globally, for a group of users or for a particular user. Entitlement data associated with the user may indicate whether the user is authorized to access data provided by a particular vendor server.

At operation 528, the web application on the enterprise server requests the browser to trigger the vendor application in accordance with the determination described above.

At operation 530, the browser constructs an SAML request to the vendor for performing single sign on (SSO) based upon the user's current login to the web application. Operation 530 also includes transmitting a request to get data for rendering in the web application.

Additionally, at operation 530, the client browser 502 may pass a unique identifier for the user session to the vendor server. The unique identifier may be the already generated session token or the enterprise token. Alternatively, it may be any identifier that can uniquely identify the user session.

Upon receipt of the request, at operation 532 the vendor server performs SSO login of the user to the vendor, and starts up the vendor application for the user session identified from the received request.

Description of FIG. 6

FIG. 6 illustrates operations 534-550 of process 500.

At operation 534, a vendor cookie is returned to the browser and stored by the browser, and a vendor session for the user ID and terminal ID combination is setup. The vendor cookie is stored in the vendor domain and is thus not accessible to enterprise web application or other applications in the enterprise domain. The vendor server, additionally, generates and provides to the client browser, an identifier that uniquely identifies one or more sessions at the vendor associated with the provided user ID and terminal ID. This unique identifier may be referred to as the "vendor session identifier" or "external session identifier". The vendor session identifier may be provided to the web application in a separate message.

The vendor session identifier is subsequently used by the enterprise components in each of its requests for connections to the vendor, so that the vendor can relate the requests to each other and establish the connections for the same user session (e.g., see description above regarding connections 416, 420 and 424).

At operation 536, the vendor data is rendered on the client browser. In some embodiments, the vendor data is rendered in an iframe.

At operation 538, the client browser executing the client portion of the web application generates a composite cookie including the enterprise cookie and the unique vendor session identifier, or composite key combining a unique session identifier provided by the enterprise server and the session identifier provided by the vendor. The composite cookie/key is stored in the browser's local cookie storage, and is also transmitted to the enterprise servers for storing at the enterprise servers.

By this technique of storing the vendor session identifier in a composite cookie or key that is accessible in the enterprise domain, each of the enterprise components can have access to the vendor session identifier in order to extract the same include within its requests for connections sent to the vendor for the same user session.

At operation 540, a heartbeat session for monitoring the health of the vendor sessions associated with the particular user ID and terminal ID combination is established between the enterprise server and vendor server.

At operation 542, the client browser triggers a browser control for rendering data from the vendor. For example, a browser control for displaying a chart or the like, based upon vendor data may be initiated at operation 542. At this stage, the browser may determine/access the vendor session identifier previously provided by the vendor. In some embodiments, the vendor session identifier may be extracted from the composite cookie/key. Note that the composite key, being stored while specifying the enterprise domain, is accessible to the web application in the same domain or in a parent domain.

At operation 544, the client browser requests the enterprise server for data to be rendered in the triggered browser control. The vendor session identifier may be passed with the request.

At operation 546, the enterprise server, receives the request and the vendor session identifier from the browser, and then transmits the request for data to the vendor application. This request for data may be transmitted by calling a vendor API specified by the vendor.

At operation 548, a second channel is established at the vendor based upon the particular vendor session. The vendor application may associate the related vendor sessions by using the vendor session identifier.

At operation 550, the browser control is rendered in a second iframe. In some embodiments, the browser control is rendered within the iframe directly from the vendor server.

Description of FIG. 7

FIG. 7 illustrates the operations 552-562 of process 500.

At operation 552, upon being triggered by the user or the web application, an addon component 504 (e.g., client side application 120*a*) associated with the web application (e.g., a native application) is started on the client terminal 501. According to some example embodiments, the addon component is a spreadsheet application (e.g., Microsoft Excel)

that, during operation, acquires and/or exchanges data from/with the web application on servers 505.

The addon component may be configured to use any of one or more browser controllers for communicating with server 505 via, for example, HTTP, for example, by exchanging HTTP messages with the web server associated with the web application. One or more browser controllers may be available on the client terminal to the addon component. A browser controller provides a capability for an application, such as an Excel program, to utilize HTTP, JSON and/or other protocols used for control and data exchange over the web. For example, the addon component may incorporate commercially or freely available browser controllers for one or more of Internet Explorer, Chrome, Firefox, Safari, etc. The native app may also include a customized add-in component that provides capabilities associated with the SSO function. Add-ins, for example, enables an Excel spreadsheet in the addon component to interact, using one or more browser controls, with web application.

Upon startup, the addon cycles through the available web browsers on the client terminal, to determine which of the browsers have a currently active cookie. In some embodiments, the addon is initiated for the first browser type that is detected to have a currently active cookie. One of the purposes for this cycling operation may be to ensure that the addon is initiated for a currently active (i.e. currently being used) browser.

In another embodiment, the addon may determine the active browser for which it should use the browser control by communicating with the server 505. For example, for each available browser controller on the client terminal, taken in a configurable predetermined order or in the order in which the browser controller is discovered by the addon component, the addon component instantiates the browser controller and transmits an HTTP request to the server 505. The request may identify all or a combination of, the user, the client terminal, web application, and the browser corresponding to the currently selected browser control. This process is repeated until either a browser type for which a session already exists or all browser types have been explored without finding an already existing session. When the server 505 receives a request from client terminal, it determines whether an active session that corresponds to the information provided (e.g., corresponding to any one or a combination of a cookie included in the HTTP request, the user, the client, web application, and the browser) with the received request exists. The determination may be made by searching the session table to identify a corresponding session. In an example embodiment, a cookie created at the time when the session is established (e.g., enterprise domain cookie) is sent by the client in each subsequent HTTP request to the server, and the server uses the received cookie to uniquely identify the corresponding session in the session table. If it is determined that a corresponding session is currently active, the session information and/or a cookie associated with the corresponding session is returned to the addon component at the client terminal. If it is determined, at the server, that no corresponding session exists for a received HTTP request, then the server returns a notification to that effect to the addon component. In some example embodiments, for example, an HTTP redirect (e.g., "302 redirect") message is returned. The native application, upon receiving a notification that the previous HTTP request did not result in identifying an existing connection, forms a new HTTP request including information regarding the next browser in the list of browsers to be tried Also at operation 552, the addon may access the composite cookie in the designated cookie storage and extract the vendor session identifier.

At operation 554, data is obtained for rendering and/or processing by the addon. Operation 554 includes passing the extracted vendor session identifier to the enterprise server and requesting vendor data.

At operation 556, the enterprise server requests the vendor for vendor data and passed the vendor session identifier received from the client.

At operation 558, the vendor initiates a third data channel associated with the particular user ID and terminal ID combination. The vendor session identifier may be used to relate the multiple data channels associated with the particular user ID and terminal ID combination.

At operation 560, the vendor data is returned to the enterprise server.

At operation 562, the enterprise server provides the received vendor data for rendering and/or processing in the client.

After the setup of the connections described above, any failure of the vendor side connections will be detected by the enterprises server via the heartbeat connection. This enables that enterprise server to either re-establish the vendor connections in cases where the vendor connection teardown was due to a miscellaneous failure, or to tear down corresponding enterprise application connections where the vendor connection teardown was due to MLP.

Description of FIG. 8

FIG. 8 shows a non-limiting example block diagram of a hardware architecture for the system 100. In the example shown in FIG. 8, the client system 810 communicates with a server system 820 via a network 840. The network 840 could comprise a network of interconnected computing devices, such as the internet. The network 840 could also comprise a local area network (LAN) or could comprise a peer-to-peer connection between the client system 810 and the server system 820.

The example client system 810 and server system 820 could correspond to clients 104 and server 102, respectively, as shown in FIG. 1. That is, the hardware elements described in FIG. 8 could be used to implement the various software components and actions shown and described herein with reference to FIG. 1. For example, the client system 810 in FIG. 8 could include at least one processor CPU 831, at least one memory 832, at least one input/output device I/O 833, and a component for generating and displaying a user interface UI 834. The at least one memory 832 may include a computer readable storage medium such as, for example, random access memory (RAM), static RAM, flash memory, magnetic disk. The I/O device 833 can be all encompassing and could include a communication device, such as a transceiver for sending and receiving data (e.g., a wireless transceiver, a wired transceiver). I/O device 833 could also include an interface for connecting a non-transitory computer readable storage medium to the client system 810 to send and receive data.

It should be appreciated that the combination of elements in client system 810 could be used to implement the example web browser applications 118, 117 and app 120a in FIG. 1. For example, the memory 832 could load the files associated with the application (e.g., HTML, XML, JavaScript files) and the CPU 831 could be used to execute instructions associated with the application. The I/O device 833 could be utilized to fetch the various elements comprising the SPA from the server system 820 and/or to interact with the user.

Server system 820 also comprises various hardware components used to implement the software elements for server 102 as shown in FIG. 1 or 200 in FIG. 2. For example, server system 102 could also include hardware components of at least one processor CPU 821, at least one memory 822, and at least one input/output device I/O 823. The at least one memory 822 may include a computer readable storage medium such as, for example, random access memory (RAM), static RAM, flash memory, magnetic disk. The I/O device 823 can be all encompassing and could include a communication device, such as a transceiver for sending and receiving data (e.g., a wireless transceiver, a wired transceiver). I/O device 823 could also include an interface for connecting a non-transitory computer readable storage medium to the server system 8200 to send and receive data. In one example embodiment, I/O device 833 of the client system can perform communication via the network with I/O 823 of the server system.

Similar to client system 810, the server system 820 could implement and/or execute the applications. For example, the memory 822 could be used to store the information in database 110 as well as the components and files utilized by web servers and application servers associated with, for example, the web applications 112 and core services 114. The CPU 821 could be used in executing the software necessary to generate the respective modules that are requested by and transmitted to the client system 810. For example, CPU 821 could be used to generate the necessary modules created by an application server. Likewise, I/O device 823 can be used by a web server to transmit the different application elements to the client system 810. Of course, these examples are non-limiting and the system envisions utilizing the hardware elements in a variety of aspects.

Description of FIG. 9

FIG. 9 may be an example implementation of a client 810 or server 820, according to some example embodiments. FIG. 9 is a block diagram of an example computing device 900 (which may also be referred to, for example, as a "computing device," "computer system," or "computing system") according to some embodiments. In some embodiments, the computing device 900 includes one or more of the following: one or more processors 902; one or more memory devices 904; one or more network interface devices 906; one or more display interfaces 908; and one or more user input adapters 910. Additionally, in some embodiments, the computing device 900 is connected to or includes a display device 912. As will explained below, these elements (e.g., the processors 902, memory devices 904, network interface devices 906, display interfaces 908, user input adapters 910, display device 912) are hardware devices (for example, electronic circuits or combinations of circuits) that are configured to perform various different functions for the computing device 900.

In some embodiments, each or any of the processors 902 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 902 uses an instruction set architecture such as x86 or Advanced RISC Machine (ARM).

In some embodiments, each or any of the memory devices 904 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 902). Memory devices 904 are examples of non-volatile computer-readable storage media.

In some embodiments, each or any of the network interface devices 906 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 908 is or includes one or more circuits that receive data from the processors 902, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 912, which displays the image data. Alternatively or additionally, in some embodiments, each or any of the display interfaces 908 is or includes, for example, a video card, video adapter, or graphics processing unit (GPU).

In some embodiments, each or any of the user input adapters 910 is or includes one or more circuits that receive and process user input data from one or more user input devices (not shown in FIG. 9) that are included in, attached to, or otherwise in communication with the computing device 900, and that output data based on the received input data to the processors 902. Alternatively or additionally, in some embodiments each or any of the user input adapters 910 is or includes, for example, a PS/2 interface, a USB interface, a touchscreen controller, or the like; and/or the user input adapters 910 facilitates input from user input devices (not shown in FIG. 9) such as, for example, a keyboard, mouse, trackpad, touchscreen, etc. . . . . .

In some embodiments, the display device 912 may be a Liquid Crystal Display (LCD) display, Light Emitting Diode (LED) display, or other type of display device. In embodiments where the display device 912 is a component of the computing device 900 (e.g., the computing device and the display device are included in a unified housing), the display device 912 may be a touchscreen display or non-touchscreen display. In embodiments where the display device 912 is connected to the computing device 900 (e.g., is external to the computing device 900 and communicates with the computing device 900 via a wire and/or via wireless communication technology), the display device 912 is, for example, an external monitor, projector, television, display screen, etc. . . . . .

In various embodiments, the computing device 900 includes one, or two, or three, four, or more of each or any of the above-mentioned elements (e.g., the processors 902, memory devices 904, network interface devices 906, display interfaces 908, and user input adapters 910). Alternatively or additionally, in some embodiments, the computing device 900 includes one or more of: a processing system that includes the processors 902; a memory or storage system that includes the memory devices 904; and a network interface system that includes the network interface devices 906.

The computing device 900 may be arranged, in various embodiments, in many different ways. As just one example, the computing device 900 may be arranged such that the processors 902 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 900 may be arranged such that: the processors 902 include two, three, four, five, or more multi-core processors; the network interface devices 906 include a first network interface device that implements Ethernet and a second network interface device that implements WiFi and/or Bluetooth; and the memory devices 904 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client devices 104, server 102, and external servers 106 etc., each of which will be referred to individually for clarity as a "component" for the remainder of this paragraph, are implemented using an example of the computing device 900 of FIG. 9. In such embodiments, the following applies for each component: (a) the elements of the 900 computing device 900 shown in FIG. 9 (i.e., the one or more processors 902, one or more memory devices 904, one or more network interface devices 906, one or more display interfaces 908, and one or more user input adapters 910), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 904 (e.g., in various embodiments, in a volatile memory device such as a RAM or an instruction register and/or in a non-volatile memory device such as a flash memory or hard disk) and all actions described herein as performed by the software modules are performed by the processors 902 in conjunction with, as appropriate, the other elements in and/or connected to the computing device 900 (i.e., the network interface devices 906, display interfaces 908, user input adapters 910, and/or display device 912); (c) alternatively or additionally, to the extent it is described herein that the component processes and/or otherwise handles data, in some embodiments, such data is stored in the memory devices 904 (e.g., in some embodiments, in a volatile memory device such as a RAM and/or in a non-volatile memory device such as a flash memory or hard disk) and/or is processed/handled by the processors |5|02 in conjunction, as appropriate, the other elements in and/or connected to the computing device |5|00 (i.e., the network interface devices |5|06, display interfaces |5|08, user input adapters |5|10, and/or display device 512); (d) alternatively or additionally, in some embodiments, the memory devices 902 store instructions that, when executed by the processors 902, cause the processors 902 to perform, in conjunction with, as appropriate, the other elements in and/or connected to the computing device 900 (i.e., the memory devices 904, network interface devices 906, display interfaces 908, user input adapters 910, and/or display device 512), each or any combination of actions described herein as performed by the component and/or by any software modules described herein as included within the component.

Consistent with the preceding paragraph, as one example, in an embodiment where an instance of the computing device 900 is used to implement the client system 104, the memory devices 904 could load the files associated with the SPA (e.g., HTML, XML, JavaScript files), and/or store the data described herein as processed and/or otherwise handled by the web browser applications 116, 117, client apps 120 and/or the client system 104. Processors 902 could be used to operate the rendering modules, networking modules, and JavaScript modules, and/or otherwise process the data described herein as processed by the web browser applications 116, 117, client apps 120 and/or the client system 104.

The hardware configurations shown in FIG. 9 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 9, (e) via other hardware arrangements, architectures, and configurations, and/or via combinations of the technology described in (a) through (e).

Technical Advantages of Described Subject Matter

In certain example embodiments, the technology described above in relation to the described cross-domain web application communication provides, among other things, capabilities to improve the efficiency with which web applications interact within a browser environment. As described in more detail above, some embodiments may be used to efficiently implement MLP in environments where cross domain web applications are in the same browser environment.

The technical features described herein may thus improve the efficiency of a computer system by providing for the efficient interaction between cross domain web applications. The technical features may also improve the security and reliability of the computer system by providing for safe interaction between cross domain web applications.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 5-7, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A system comprising:
a server device comprising a server-side process of an application operating in a first domain; and
a client terminal comprising a first client application operating in the first domain and providing a first client-side portion of the application, and a second client application providing a second client-side portion of the application and operating in a second domain different from the first domain,
wherein the second client application receives a session identifier which uniquely identifies a user session at an external server in the second domain, and stores a composite data structure in the first domain, the composite data structure comprising the received session identifier,
wherein the first client application retrieves the session identifier from the stored composite data structure, and transmits to the server-side portion of the application, a request that includes the stored session identifier, and
wherein the server device is configured to, in response to receiving the request from the client terminal, monitor a plurality of connections between the server device and the external server, each connection being associated with the session identifier at the external server.

2. The system according to claim 1, wherein the server device is configured to:
create a heartbeat connection with the external server, wherein the heartbeat connection is configured to detect failure in any connection associated with the same user session at the external server;
responsive to detecting a failure in said any connection, identify other connections using the session identifier obtained from either the message from the client terminal or from the composite data structure, said other connections each being associated with the same user session at the external server; and
process the identified connections.

3. The system according to claim 1, wherein storing the composite data structure in the first domain includes storing the composite data structure in a browser context by the first client application, and wherein at least one HTTP request for a connection for the user session is initiated by the second client application and includes the session identifier obtained from the stored composite data structure.

4. The system according to claim 1, wherein the composite data structure further comprises a first domain session identifier generated by the server device and associated with the user session, and wherein the first client application and the second client application both include the first domain session identifier in at least one HTTP request transmitted to the external server for a connection to the user session.

5. The system according to claim 1, wherein said at least one of the first client application and the second client application runs within a browser in the first domain.

6. The system according to claim 5, wherein said at least one of the first client application and the second client application executes in a window within the browser.

7. The system according to claim 1, wherein the first domain and the second domain are each identified by a respectively different domain name service domain name.

8. The system according to claim 1, wherein a name of the second domain is defined as a child domain of a domain name service name of the first domain.

9. The system according to claim 1, wherein the first domain and the second domain are administered by different entities and are assigned by a domain name service registrar.

10. A client terminal comprising:
a memory; and
a processor configured to perform operations comprising:
running a first client application operating in a first domain and providing a first client-side portion of an application to receive data from a server in a first domain;
running a second client application operating in a second domain different from the first domain and providing a second client-side portion of the application;
receiving, by the second client application, an external session identifier which uniquely identifies the user session at an external server in the second domain;
storing, by the second client application, a composite data structure in the first domain, the composite data structure comprising the external session identifier;
retrieving, by the first client application, the stored composite data structure; and
transmitting, by the first client application to a server-side portion of the application on a server device, a request including the external session identifier obtained from the retrieved composite data structure,
wherein, in response receiving the external session identifier from the first client application, the server device monitors a plurality of connections each being associated with the external session identifier at the external server.

11. The client terminal according to claim 10, wherein storing the composite data structure in the first domain includes storing the composite data structure in a browser context by the first client application, and wherein subsequently at least one request for a connection for the user session is initiated by the second client application.

12. The client terminal according to claim 10, wherein the composite data structure further comprises a first domain session identifier generated by the at least one server and associated with the user session, and wherein the first client application and the second client application both include the first domain session identifier in at least one request for connection for the user session.

13. The client terminal according to claim 12, wherein the first domain session identifier identifies each of a plurality of connections between the at least one server and the external session identifier identifies each of a plurality of connections between the external server and the server device and/or the client terminal.

14. The client terminal according to claim 10, wherein said at least one of the first client application and the second client application runs within a browser in the first domain.

15. The client terminal according to claim 14, wherein said at least one of the first client application and the second client application executes in a window within the browser.

16. The client terminal according to claim 10, wherein the first client application is a browser and the second client application executes, in a domain different from a domain of the browser, within an iframe in the browser.

17. The client terminal according to claim 16, wherein the processor is further configured to execute a third client application in a separate window in the browser, wherein the third client application is in a same domain as the second client application, and wherein the server device associates each of the second client application and the third client application with the external session identifier received from the client terminal.

18. A method performed by a processor in a client computer terminal comprising:
running a first client application providing a first client-side portion of an application to receive data from a server device in a first domain, wherein the first client application communicates with a server-side portion of the application on the server device;
running a second client application providing a second client-side portion of the application, wherein the second client application communicates with an external server device operating in a second domain different from the first domain;
receiving, by the second client application, an external session identifier which uniquely identifies the user session at the external server device;
storing, by the second client application, a composite data structure in the first domain, the composite data structure comprising the external session identifier;
retrieving, by the first client application, the external session identifier from the stored composite data structure; and
transmitting, by the first client application to the server-side portion of the application, a request to receive data from the user session, wherein the request includes the retrieved external session identifier,
wherein the server device, in response receiving the external session identifier from the first client application, monitors a plurality of connections each being associated with the external session identifier at the external server.

19. The method according to claim 18, wherein storing the composite data structure in the first domain includes storing the composite data structure in a browser context by the first client application, and wherein at least one subsequent request for a connection for the user session is initiated by the second client application.

20. The method according to claim 19, wherein the composite data structure further comprises a first domain session identifier generated by the server device and associated with the user session, and wherein the first client application and the second client application both include the first domain session identifier in at least one connection request transmitted to the external server device for the user session.

* * * * *